United States Patent Office 3,558,602
Patented Jan. 26, 1971

3,558,602
6-(AMINOCYCLOPENTENE - 1 - CARBOXAMIDO) PENICILLANIC ACIDS AND DERIVATIVES THEREOF
Harvey E. Alburn, West Chester, and Norman H. Grant, Wynnewood, Pa., assignors to American Home Products Corporation, New York, N.Y., a corporation of Delaware
No Drawing. Filed Nov. 20, 1968, Ser. No. 777,482
Int. Cl. C07d 99/16
U.S. Cl. 260—239.1                2 Claims

ABSTRACT OF THE DISCLOSURE

This is concerned with 6-(1-aminocyclopentene-1-carboxamido)penicillanic acids and 6-(4-oxo-1,3-diazaspiro[4,4]nonen-3-yl)penicillanic acids having potent activity against gram-negative and gram-positive microorganisms.

---

The present invention relates to new and novel synthetic penicillins. In particular, this invention relates to 6-(1-aminocyclopentene-1-carboxamido)penicillanic acids and 6 - (4-oxo-1,3-diazaspiro[4,4]nonen-3-yl)penicillanic acids which in standard and accepted biological procedures have demonstrated antibacterial activity.

The new and novel penicillins within the scope of the present invention are exemplified by the following structural formulae:

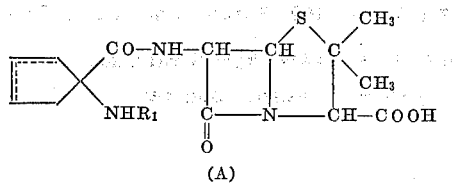

(A)

and

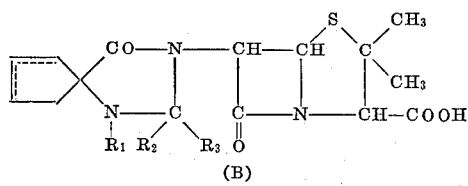

(B)

wherein $R_1$ is selected from the group consisting of hydrogen, lower alkyl and phen(lower)alkyl; $R_2$ and $R_3$ when taken separately are selected from the group consisting of hydrogen, lower alkyl and phenyl; $R_2$ and $R_3$ when taken together with the carbon atom to which they are attached form a ring which is cyclo(lower)alkyl; the broken line represents a double bond in either of the two designated positions; and the nontoxic, biologically active salts thereof, including nontoxic metallic salts, such as, sodium, potassium, calcium and aluminum, the ammonium salt and substituted ammonium salts, e.g., salts of such nontoxic amines as trialkylamines, including triethylamine, procaine, dibenzylamine, N-benzyl-$\beta$-phenethylamine, N,N' - dibenzylethylenediamine, N-(lower)alkylpiperidine, e.g., N-ethylpiperidine and other amines which have been used to form salts with benzylpenicillin and the like. As employed herein the term "lower alkyl" and the like are meant to include both branched and straight chain hydrocarbon moieties containing from one to about seven carbon atoms. Typical examples of the compounds of this invention are: 6-(1-amino-3-cyclopentene - 1 - carboxamido)penicillanic acid; 6-(1-amino-2-cyclopentene-1-carboxamido)penicillanic acid; 6-(2,2-dimethyl-4-oxo-1,3-diazaspiro[4,4]non-7-en-3-yl)penicillanic acid; and 6-(2,2-dimethyl-4-oxo-1,3-diazaspiro[4,4]non-6-en-3-yl)penicillanic acid.

In the new and novel penicillins of the present invention which are represented by structural Formula A, the acyl substituent has an asymmetric center and two possible diastereoisometric forms as well as the racemic forms thereof.

The new and novel penicillins of the present invention may be prepared by the process depicted by the following reaction sequence:

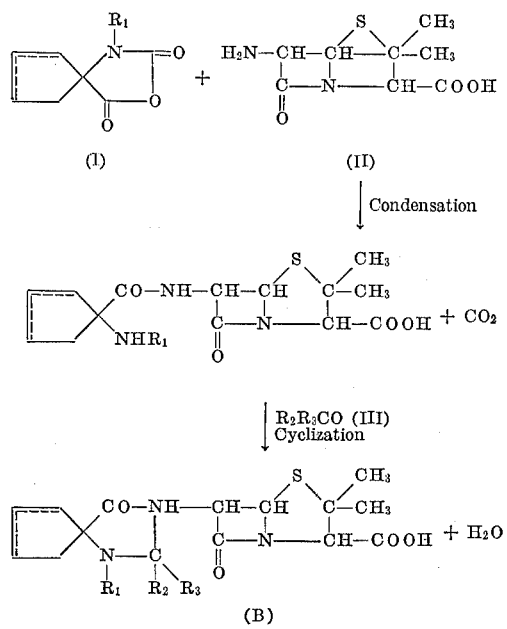

wherein $R_1$, $R_2$, $R_3$ and the broken line are defined as above. The condensation reaction is effected by slowly adding a 3-oxa-1-azaspiro[4,4]nonene-2,4-dione (I) to an aqueous solution of a 6-aminopenicillanic acid (II, 6 APA) which is buffered with a base, e.g., triethylamine, alkali metal bicarbonate and the like to a pH of about 5 to about 7. Preferably this addition is made with stirring over a period of about an hour with continued stirring for an additional hour.

When the condensation is complete, the resulting 6-(1-aminocyclopentene-1-carboxamido)pencillanic acid (A) is separated by standard recovery procedures. For example, the reaction mixture is lyophilized; the residue dissolved in an alkanol, e.g., methanol; a crystallizing solvent is added, such as, ethyl ether or hexane; and the precipitated product (A) separated by filtration.

The cyclization reaction is effected by admixing an above-prepared 6-(1-aminocyclopentene-1-carboxamido)-penicillanic acid (A) with a suitable carbonyl compound (III), in an organic solvent at about reflux temperatures to afford the desired 6-(4-oxo-1,3-diazaspiro[4,4]nonen-3-yl)penicillanic acid (B), usually as a filterable residue. As employed herein by the term "carbonyl compound" is meant those compounds which contain a carbonyl group which is capable of undergoing a Mannich type reaction with the reactive nitrogen atoms of both the 6-amino group of the penicillanic acid moiety and the amino group attached to the carbon atom of the cyclopentene group which is connected to the penicillin moiety. By the term "organic solvent" is meant any polar liquid capable of forming a distillable reaction mixture of the reactants (I and II).

The 3-oxa-1-azaspiro[4,4]nonene-2,4-dione (I) starting materials employed in the above process are prepared by the procedures which is described in copending United States patent application Ser. No. 777,506, entitled "Cyclopentene Derivatives," by Harvey E. Alburn and Horace Fletcher III, which was filed in the United States Patent Office on the same day as the subject application, and identified by attorney docket number AHP–4914. Therein these starting compounds are prepared by the amidation of a cyclopentene-1,1-dicarboxylate to obtain a cyclopentene-1,1-dicarboxamide; which is cyclized by contact with an alkali metal hypohalite to yield a 1,3-diazaspiro-[4,4]nonene-2,4-dione; which is cleaved by contact with barium hydroxide to produce a 1-aminocyclopentene-1-carboxylic acid; which may be alkylated by standard methods to the corresponding 1-(N-alkylamino)cyclopentene-1-carboxylic acid and then cyclizing either of the two latter carboxylic acids to afford an appropriate 3-oxa-1-azaspiro[4,4]nonene-2,4-dione (I). The 6-aminopenicillanic acid reactant may be prepared by numerous methods now available in the prior art, including the methods referred to in United States Pats. Nos. 2,985,648 and 3,032,473. The carbonyl compound (III) starting materials are commercially available and/or are easily prepared by procedures well known in the chemical art.

The new and novel 6-(1-aminocyclopentene-1-carboxamido)penicillanic acids (A) and 6-(4-oxo-1,3-diazaspiro[4,4]nonen-3-yl)penicillanic acids (B) of the present invention possess valuable biological activity. In particular, in standard and accepted biological tests these compounds have exhibited activity against gram-positive and gram-negative bacteria. In this regard, these compounds are, therefore, of value as antibacerterial agents, nutritional supplements in animal feed; agents for the treatment of mastitis in cattle; and as therapeutical agents in poultry and mammals, in the treatment of infectious diseases caused by gram-positive and gram-negative bacteria, upon either parenteral or oral administration. It should be noted that the 6-(1-aminocyclopentene-1-carboxamido)penicillanic acids (A) of this invention have shown outstanding in vivo activity against penicillin resistant Staphylococci. Further, when employed as antibacterial agents the penicillins of this invention (A and B) are significantly less toxic to the recipient host then related prior art penicillins. Still further, the 6-(4-oxo-1,3-diazaspiro[4,4]nonen-3-yl)penicillanic acids (B) are also more stable and less susceptible to hydrolysis on standing in aqueous solution.

As previously indicated, when the compounds (A and B) of this invention are employed in mamals, e.g., mice, rats, dogs, monkeys and the like, they may be administered orally or parenterally. Naturally, the dosage of these compounds will vary somewhat with the form of administration and the particular compound chosen. Furthermore, it will vary with the particular subject under treatment. In general, the compounds of this invention are most desirably administered at a concentration level that that is in the range of from about 10 to about 400 mg. per kilo per day, although as aforementioned variations will occur. However, this dosage range will generally afford effective results without causing any harmful or deleterious side effects.

The following examples are given by way of illustration and are not to be construed as limitations of this invention, many variations of which are possible without departing from the scope and spirit thereof.

EXAMPLE I

To a mixture of 4 g. of 6-aminopenicillanic acid in 48 ml. of water which is adjusted of pH 5.8 with triethylamine, there is added 2.8 g. of 3-oxa-1-azaspiro[4,4]non-7-ene-2,4-dione over a one hour period. After an additional hour of stirring, the system is dried by lyophilization. The product is dissolved in 70 ml. of methanol, and sufficient ethyl ether is added to initiate crystallization (14 ml.). After fifteen minutes of stirring, the system is filtered, giving 3.5 g. of crystalline 6-(1-amino-3-cyclopentene-1-carboxamido)penicillanic acid.

Analysis.—Calc'd for $C_{14}H_{19}N_3O_4S \cdot H_2O$ (percent): C, 49.0; H, 6.13; N, 12.2; S, 9.32; $H_2O$, 5.25. Found (percent): C, 48.5; H, 6.12; N, 12.1; S, 9.40; $H_2O$, 5.00.

EXAMPLE II

Repeating the procedure of Example 1 to react 6-aminopenicillanic acid with the following reactants, there is afforded the hereinafter listed penicillanic acids:

| Reactant | Penicillanic acids |
| --- | --- |
| 3-oxa-1-azaspiro[4,4]non-6-ene-2,4-dione. | 6-(1-amino-2-cyclopentene-1-carboxamido)penicillanic acid. |
| 1-benzyl-3-oxa-1-azaspiro[4,4]non-6-ene-2,4-dione. | 6-[1-(N-benzylamino)-2-cyclopentene-1-carboxamido]penicillanic acid. |
| 1-ethyl-3-oxa-1-azaspiro[4,4]non-7-ene-2,4-dione. | 6-[1-(N-ethylamino)-3-cyclopentene-1-carboxamido]penicillanic acid. |
| 1-butyl-3-oxa-1-azaspiro[4,4]non-6-ene-2,4-dione. | 6-[1-(N-butylamino)-2-cyclopentene-1-carboxamido]penicillanic acid. |
| 1-(2-phenethyl)-3-oxa-1-azaspiro[4,4]non-7-ene-2,4-dione. | 6-[1-(N-[2-phenethyl]amino)-3-cyclopentene-1-carboxamido]penicillanic acid. |
| 1-(3-phenpropyl)-3-oxa-1-azaspiro[4,4]non-6-ene-2,4-dione. | 6-[1-(N-[3-phenpropyl]amino)-2-cyclopentene-1-carboxamido]penicillanic acid. |

EXAMPLE III

A mixture of 2 g. of 6-(1-amino-3-cyclopentene-carboxamido)penicillanic acid, 0.1 g. of p-toluenesulfonic acid, and 400 ml. of acetone is subjected to a slow distillation with periodic replacement of the acetone over a period of five hours. The reaction mixture is filtered, the filtrate concentrated to about 20 ml. and chilled. There is then added 100 ml. of ethyl ether, and the suspension is filtered to afford 6-(2,2-dimethyl-4-oxo-1,3-diazaspiro[4,4]non-7-en-3-yl)penicillanic acid.

EXAMPLE IV

A mixture of 3 g. of 6-(1-amino-2-cyclopentene-carboxamido)penicillanic acid, 0.1 g. of p-toluenesulfonic acid, and 600 ml. of acetone is prepared. The reaction is carried out in a six hour distillation process during which acetone is re-added to the system periodically. The residue is removed by filtration, and the filtrate evaporated to 25 ml. Then 100 ml. of ethyl ether is added, giving a precipitate which is 6-(2,2-dimethyl-4-oxo-1,3-diazaspiro[4,4]non-6-en-3-yl)penicillanic acid.

EXAMPLE V

When the procedure of Example III and IV is repeated to react a 6-(1-aminocyclopentenecarboxamido)penicillanic acid with an appropriate carbonyl compound, the following products are obtained:

| Reactants | Products |
| --- | --- |
| Formaldehyde and 6-(1-amino-3-cyclopentene-1-carboxamido)-penicillanic acid. | 6-(4-oxo-1,3-diazaspiro[4,4]non-7-en-3-yl)penicillanic acid. |
| Propionaldehyde and 6-(1-amino-2-cyclopentene-1-carboxamido)-penicillanic acid. | 6-(2-ethyl-4-oxo-1,3-diazaspiro[4,4]non-6-en-3-yl)penicillanic acid. |
| Methylethylketone and 6-[1-(N-benzylamino)-2-cyclopentene-1-carboxamido]penicillanic acid. | 6-[1-(N-benzylamino)-2-ethyl-2-methyl-4-oxo-1,3-diazaspiro[4,4]non-6-en-3-yl]penicillanic acid. |
| Cyclohexanone and 6-(1-amino-3-cyclopentene-1-carboxamido)-penicillanic acid. | 6-(2,2-cyclohexyl-4-oxo-1,3-diazaspiro[4,4]non-7-en-3-yl)penicillanic acid. |
| Acetaldehyde and 6-[1-(N-ethylamino)-3-cyclopentene-1-carboxamido]penicillanic acid. | 6-[1-(N-ethylamino)-2-methyl-4-oxo-1,3-diazaspiro[4,4]non-7-en-3-yl]penicillanic acid. |
| Butyraldehyde and 6-[1-(N-butylamino)-2-cyclopentene-1-carboxamido]penicillanic acid. | 6-[1-(N-butylamino)-2-propyl-4-oxo-1,3-diazaspiro[4,4]non-6-en-3-yl]penicillanic acid. |
| Isobutyraldehyde and 6-(1-amino-2-cyclopentene-1-carboxamido)-penicillanic acid. | 6-(2-isopropyl-4-oxo-1,3-diazaspiro[4,4]non-6-en-3-yl)penicillanic acid. |
| Cyclopentanone and 6-(1-amino-3-cyclopentene-1-carboxamido)-penicillanic acid. | 6-(2,2-cyclopentyl-4-oxo-1,3-diazaspiro[4,4]non-7-en-3-yl)penicillanic acid. |
| Benzaldehyde and 6-(1-amino-2-cyclopentene-1-carboxamido)-penicillanic acid. | 6-(2-phenyl-4-oxo-1,3-diazaspiro[4,4]non-6-en-3-yl)penicillanic acid. |
| Methylpentylketone and 6-(1-amino-3-cyclopentene-1-carboxamido)penicillanic acid. | 6-(2-methyl-4-oxo-2-pentyl-1,3-diazaspiro[4,4]non-7-en-3-yl)penicillanic acid. |
| Acetone and 6-[1-(N-[2-phenethyl]amino)-3-cyclopentene-1-carboxamido]-penicillanic acid. | 6-[1-(N-[2-phenethyl]amino)-2,2-dimethyl-4-oxo-1,3-diazaspiro[4,4]non-7-en-3-yl]penicillanic acid. |
| Formaldehyde and 6-[1-(N-[3-phenpropyl]amino)-2-cyclopentene-1-carboxamido]-penicillanic acid. | 6-[1-(N-[3-phenpropyl]amino)-4-oxo-1,3-diazaspiro[4,4]non-6-en-3-yl]penicillanic acid. |

What is claimed is:

1. A compound selected from the group consisting of those having the formulae:

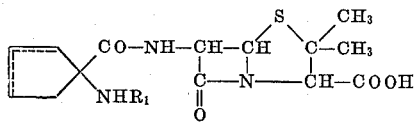

and

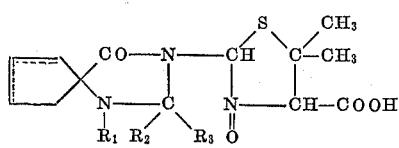

wherein $R_1$ is selected from the group consisting of hydrogen, lower alkyl and phen(lower)alkyl; $R_2$ and $R_3$ when taken separately are selected from the group consisting of hydrogen, lower alkyl and phenyl; $R_2$ and $R_3$ when taken together with the carbon atom to which they are attached form a ring which is cyclo(lower)alkyl; the broken line represents a double bond in one of the two designated positions; and the nontoxic, biologically active salts thereof.

2. 6 - (1-amino-3-cyclopentene-1-carboxamido)penicillanic acid.

References Cited

UNITED STATES PATENTS 3,351,587   11/1967   Alburn et al.   260—239.1

NICHOLAS S. RIZZO, Primary Examiner

U.S. Cl. X.R.

260—307; 424—271

PO-1050
(5/69)

UNITED STATES PATENT OFFICE
CERTIFICATE OF CORRECTION

Patent No. 3,558,602        Dated September 21, 1973

Inventor(s) Harvey E. Alburn and Norman H. Grant

It is certified that error appears in the above-identified patent and that said Letters Patent are hereby corrected as shown below:

Column 2, lines 10-15, in formula (II), there is a superfluous bond between the two C atoms attached to the S atom. Accordingly, formula (II) should read instead as follows:

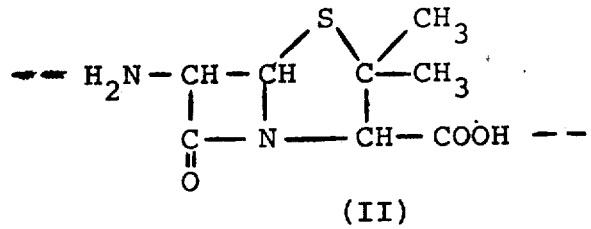

(II)

lines 30-35, in the formula, the portion thereof appearing as:

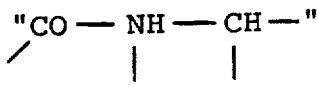

has adjacent the "N", an "H" erroneously added, whereby said formula (B) should read:

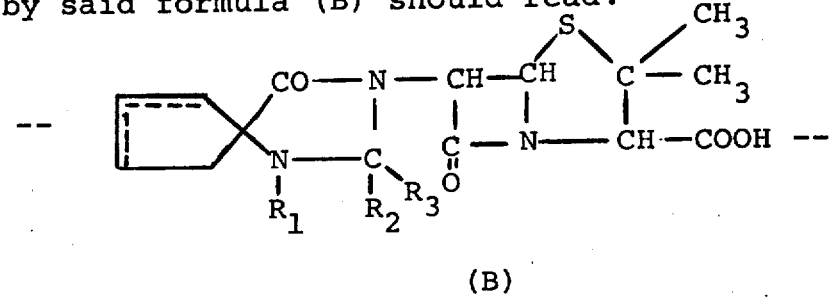

(B)

UNITED STATES PATENT OFFICE
CERTIFICATE OF CORRECTION

Patent No. 3,558,602  Dated September 21, 1973

Inventor(s) Harvey E. Alburn and Norman H. Grant

It is certified that error appears in the above-identified patent and that said Letters Patent are hereby corrected as shown below:

- 2 -

Column 3, line 28 "antibacerterial" should read --antibacterial--.

lines 51-52, "that that" should read --that--.

lines 64, "of" second occurrence should read -- to

Column 5, lines 10-15, (in Claim 1) the formula which presently reads as follows:

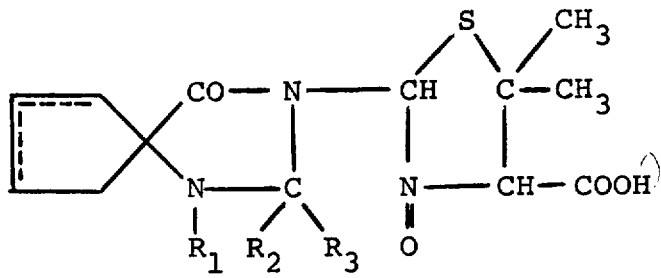

should read:

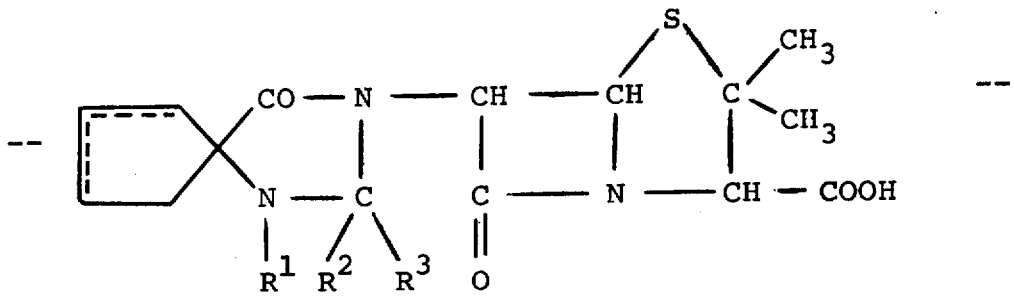

Signed and sealed this 2nd day of April 1974.

(SEAL)
Attest:

EDWARD M. FLETCHER, JR.
Attesting Officer

C. MARSHALL DANN
Commissioner of Patent